(12) United States Patent
Tanaka et al.

(10) Patent No.: US 6,813,706 B2
(45) Date of Patent: Nov. 2, 2004

(54) DATA PROCESSING SYSTEM AND MULTIPROCESSOR SYSTEM

(75) Inventors: Nobuyoshi Tanaka, Machida (JP); Ken Namura, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 599 days.

(21) Appl. No.: 09/838,012

(22) Filed: Apr. 19, 2001

(65) Prior Publication Data

US 2002/0166008 A1 Nov. 7, 2002

(51) Int. Cl.$^7$ ................................................. G06F 9/38
(52) U.S. Cl. ......................... 712/225; 711/1; 711/100; 711/147; 345/506
(58) Field of Search ........................... 712/227; 711/1, 711/100, 147; 345/506

(56) References Cited

U.S. PATENT DOCUMENTS 5,724,602 A * 3/1998 Tanaka et al. ............... 712/32
5,790,857 A * 8/1998 Clifford et al. ............. 345/700
5,907,716 A * 5/1999 Yoshimura .................. 710/54
6,230,191 B1 * 5/2001 Walker ........................ 709/213
6,347,348 B1 * 2/2002 Webber ....................... 710/52
6,493,706 B1 * 12/2002 Mead et al. .................. 707/3
6,578,092 B1 * 6/2003 Lau et al. .................... 710/29

* cited by examiner

Primary Examiner—William M. Treat
(74) Attorney, Agent, or Firm—Douglas W. Cameron (57) ABSTRACT

The present invention provides an information processing system that can have the optimum number of FIFO stages dynamically at any given time so that the system makes it possible to omit analyzing of the number of FIFO stages from data characteristics so as to improve the performance. The information processing system includes a data FIFO 22 for storing data sets and a next pointer 29 having the same number of storage positions as that of the data FIFO 22. A preceding data set is stored in the storage position "1" of the data FIFO 22 and a subsequent data set is stored in the storage position "7" of the data FIFO 22. At this time, the storage position "1" of the next pointer 29 stores "7" as information on a storage position for the subsequent data set. According to this information "7", the subsequent data set is read from the storage position "7" of the data FIFO 22.

14 Claims, 7 Drawing Sheets

DATA PROCESSING SYSTEM AND MULTIPROCESSOR SYSTEM

FIELD OF THE INVENTION

The present invention relates to a multiprocessor system that distributes sequentially received data among a plurality of parallel processors, and particularly to a multiprocessor system usable for graphic processing for generating and displaying computer graphics images on a display. More particularly, the present invention relates to a multiprocessor system usable for texture mapping so as to paste a pattern or texture (e.g. marble, bark, aluminum, etc.) on a surface of a three-dimensional object.

BACKGROUND ART

Applicable fields of commuters have been expanded along with technical innovations in recent years. One example of such fields is "computer graphics" for creating and processing graphics and images by a computer. Recently "three-dimensional graphics" that generates and displays a two-dimensional image of a three-dimensional object has come to be highlighted as computer display capability has been enhanced and graphic processing has been advanced. The three-dimensional graphics mentioned here represents by a mathematical model an optical phenomenon occurring, for example, when a three-dimensional object is illuminated by a light source, and generates an image by applying shading or gradation to the surface of the object based on the mathematical model, thereby displaying the object as a three-dimensional like image on a screen. Such a three-dimensional graphics technique has been used more and more in CAD/CAM in scientific, engineering, manufacturing and other application fields, and in various software development fields.

Generally, three-dimensional graphics processing includes two processes; "modeling" and "rendering". "Modeling" is a process for inputting to a computer and editing data such as shape, color, and surface characteristics of a three-dimensional object (e.g. an aircraft, a building, a cat, etc.) to be rendered on a screen.

In other words, modeling is a process for fetching data associated with the object into a computer in a format usable for the subsequent rendering. There are several methods for the modeling, such as CSG (Constructive Solid Geometry), polygon, Bezier, metaball, etc.

"Rendering" is a process for generating an image according to what the object looks like when it is seen from a particular position. Specifically, it is a process for coloring and shading the surface of a three-dimensional object on the basis of three-dimensional data (e.g. a position of a light source relative to the object, highlight, shade, and color) created by a modeler. The rendering process is subdivided into the respective operations "coordinate conversion", "hidden surface removal", "shading", and "measure for giving reality". The "coordinate conversion" converts each coordinate value used to define a model to a coordinate value on a screen as seen from a viewpoint position. The "hidden surface removal" determines portions of the model which are either visible or hidden from a current viewpoint. A typical example thereof is the Z Buffer method. The "shading" determines color and brightness of each portion of the object to be seen under the lighting, and applies the determined color to a corresponding pixel on the screen. The "measure for giving reality" is usually carried out after rendering. This measure is required because (1) each graphics processing step up to the rendering is based on the assumption that a surface of an object is a completely smooth curved surface which can be represented by ideal planes or mathematical expressions or that colors on the surface are constant for each plane, and (2) an image obtained by the steps of coordinate conversion → hidden surface removal → shading is inorganic and far from the real object. One example of the "measure for giving reality" is mapping, that is, a process for pasting pre-created pattern data on a surface and/or plane of an object.

Mapping is important for realistically representing the material characteristics of an object. One example thereof is texture mapping in which texture means a pattern or image representing a feeling of material of an object surface (or design of the surface) without a thickness. Texture mapping is done by preparing a texture of each material (e.g. marble stone, bark, aluminum, or the like) as a bitmap in advance, and pasting the texture on a relatively smooth plane or curved surface of the object immediately after the rendering process is ended. According to such a texture mapping, the object having a monotonous surface can be made look like a real one having a complex surface. For example, in a flight simulator, an image of a scene photographed beforehand is texture-mapped on the background to generate a virtual reality picture quickly. It is also possible to make a simple solid model look like a metallic one or stone.

Texture mapping requires access to an enormous amount of data and involves a great deal of computation processing. This is because the amount of texture data (i.e. two-dimensional array data representing an image such as patterns to be pasted, background, etc.) is enormous. Consequently, real time operations for the texture mapping must unavoidably be done in parallel by providing a plurality of pipelines; it is almost impossible to cope with such texture mapping by a single unit. Parallel processing for the texture mapping is done, for example, by dividing a screen into a plurality of areas and distributing processing operations for each of the divided areas among parallel processors.

Figure 6:
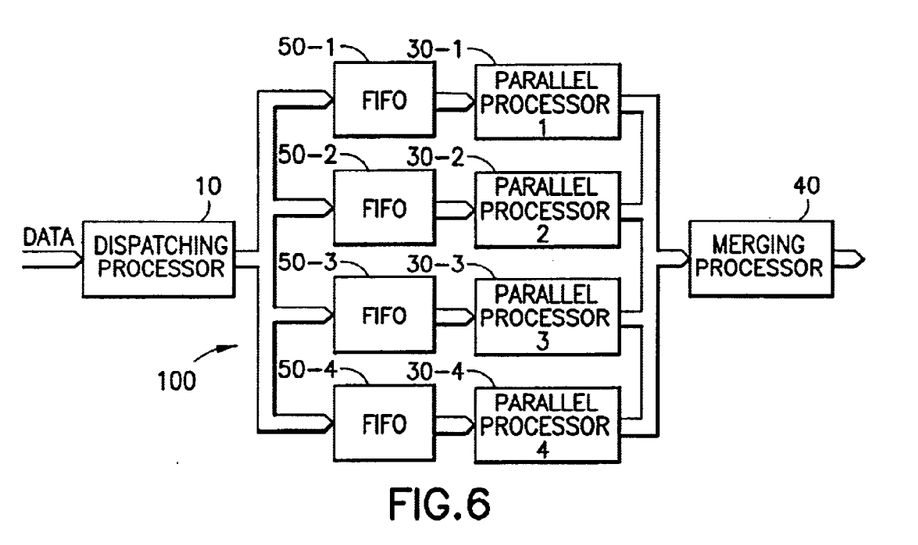
FIG. 6 is a schematic hardware block diagram of a multiprocessor system.

FIG. 6 shows a schematic block diagram of a hardware configuration of a multiprocessor system 100. In FIG. 6, a multiprocessor system 100 comprises a dispatching processor 10; a plurality of parallel processors 30-1 through 30-4 (four processors in FIG. 6); first-in first-out (FIFO) buffers 50-1 through 50-4, one for each of the parallel processors 30-1 through 30-4; and a merging processor 40. The dispatching processor 10 is a computing unit for distributing data sets (a unit of data to be distributed is referred to as a "data set" in this specification) received sequentially to each of the parallel processors 30-1 through 30-4 according to the attribute of data, etc. The FIFOs 50-1 through 50-4 are disposed before the corresponding parallel processors 30-1 through 30-4, respectively, and enabled to store distributed data sets temporarily and send the data sets sequentially to the parallel processors 30-1 through 30-4 as they complete data processing for the preceding data sets. The merging processor 40 is a computing unit for integrating data sets distributed by the dispatching processor 10 and processed by the parallel processors 30-1 through 30-4 again and outputting the integrated data sets.

In the multiprocessor system, it is desirable that a load (i.e. an amount of data processed per unit time) is evenly imposed on each of the parallel processors. If loads are evenly distributed, it is possible to perform efficient parallel processing and the overall performance of the system would be improved in proportion to the number of pipelines (i.e. parallel processors). For example, the system 100 shown in FIG. 6 is considered to be well-balanced in design in case the total processing speed of all the parallel processors is equal to the speed of data input to the system 100. In other words, if the loads are unevenly distributed, it would be impossible to benefit from the distributed processing.

Figure 7:
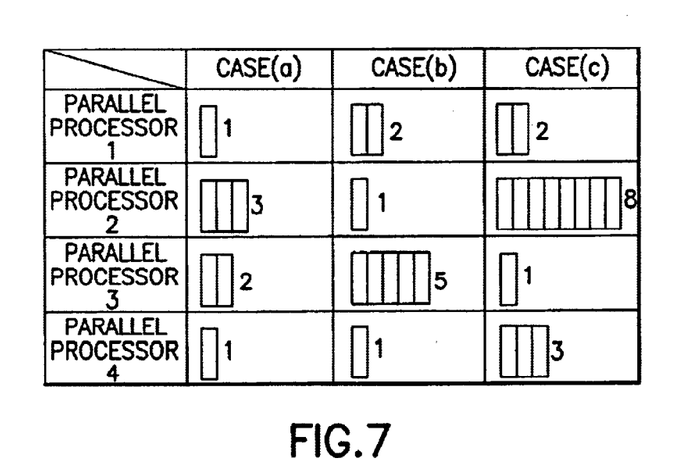
FIG. 7 is a chart illustrating three cases in which loads are unevenly distributed among parallel processors in the multiprocessor system shown in FIG. 6.

In the multiprocessor system 100 shown in FIG. 6, the amount of data (load) distributed to each of the parallel processors 30-1 through 30-4 may become uneven relatively often. For example, this occurs when data sets are unevenly distributed among the parallel processors as shown in Cases (a), (b), and (c) in FIG. 7. Also, even if the load imposed on each of the parallel processors 30-1 through 30-4 is even or uniform on average in a long time period, the load may often become uneven at a certain point of time depending on the order of data sets arranged. Such data sets distributed unevenly, when they are accumulated, may cause the FIFO of a particular pipeline to overflow with outstanding data sets. As a matter of course, the dispatching processor 10 cannot distribute succeeding data sets to the filled FIFO. Consequently, the flow of data sets in the whole system is stopped due to some busy pipelines. Thus, the system cannot benefit from the distributed processing.

If even distribution of loads is assured in a long time period, it would be possible to compensate a momentary uneven distribution of the loads with a design that increases the number of stages of each FIFO 50-1 through 50-4 infinitely (or large enough to be assumed as infinite). For example, in order to accommodate unevenness of loads shown in Case (a) in FIG. 7, the FIFO will have to be provided with at Least three stages or storage positions. Similarly, in order to accommodate unevenness of loads shown in Cases (b) and (c) in FIG. 7, the FIFOs will have to be provided with at least five and eight stages, respectively. Increasing the number of stages in an FIFO would be an easy way for accommodating unevenly distributed data.

However, even when one or some parallel processors are busier than other parallel processors and their FIFOs overflow, all the FIFOs of other parallel processors do not always overflow. Consequently, increasing the number of stages in an FIFO would result in increasing the number of unused or surplus stages. For example, when data sets are distributed to a multiprocessor system provided with FIFOs, each having eight stages, in a manner shown in Case (c) in FIG. 7, the number of used stages is fourteen while the number of unused stages is eighteen. The reason why a large number of stages are provided for an FIFO is mainly in preparation for possible uneven distribution of the data sets, rather than expecting that all the storage positions are always used. Mounting storage elements having low usage efficiency would be wasteful in circuit design and manufacturing.

Increasing the number of FIFO stages will also increase the gate size of the circuit because the size of FIFO is proportional to the product of data bit width, the number of stages, and the number of pipelines (=bit width (W)×number of stages (D)×number of pipelines (N)). A texture mapping LSI may be implemented by, for example, the ASIC technique. An FIFO having a huge number of stages (or bits) occupies a large chip area which becomes an obstacle to circuit design and causes the manufacturing cost to be increased accordingly.

In summary, the solution that increases the number of stages of an FIFO (or expands a data buffer) has a tradeoff, that is, a throughput of the entire system would be improved while some disadvantages would come out in the circuit design.

Figure 8:
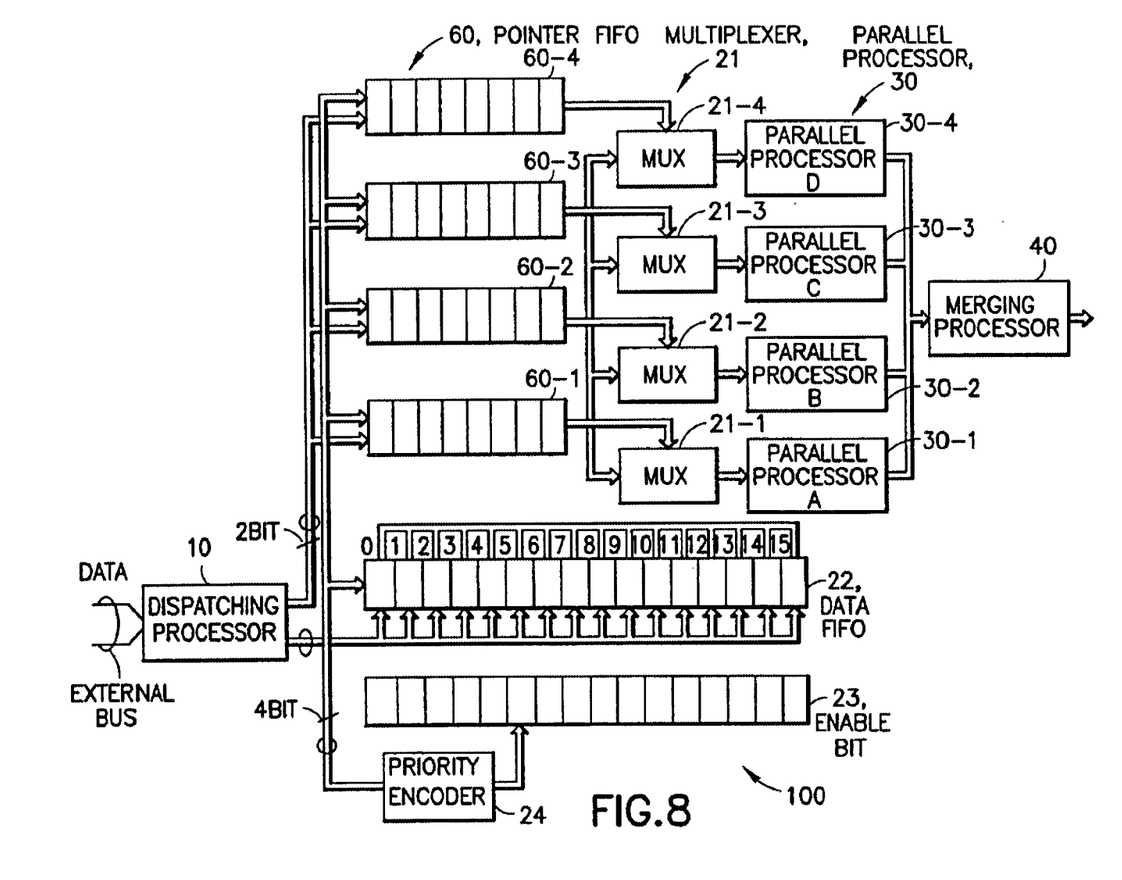
FIG. 8 is a hardware block diagram of a conventional multiprocessor system.

In order to solve the above problems, Japanese Published Unexamined Patent Application No. 9-185593 (U.S. Pat. No. 5,724,602) discloses a multiprocessor system 100 shown in FIG. 8 which includes:

(a) a dispatching processor 10 for distributing received data sets to each pipeline;

(b) a plurality of parallel processors 30 (30-1 through 30-4) provided for the respective pipelines to process data sets distributed thereto;

(c) a data FIFO 22 for temporarily storing one or more data sets received sequentially from the dispatching processor 10;

(d) a plurality of pointer FIFOs 60 (60-1 through 60-4), each of which is disposed at a pipeline, before a corresponding parallel processor 30 so as to temporarily store storage positions in the data FIFO 22 where data sets distributed to the corresponding parallel processor 30 are stored;

(e) a priority encoder 24 for determining the storage positions of data sets in the data FIFO 22 and writing the determined storage positions in a pointer FIFO 60 of the corresponding pipeline;

(f) a plurality of multiplexers 21 (21-1 through 21-4), each of which is disposed at a pipeline, between a corresponding parallel processor 30 and pointer FIFO 60 and enabled to pass a data set read from a storage position in the data FIFO 22 according to the output of the pointer FIFO 60 to the parallel processor 30; and (g) a merging processor 40 for integrating data sets processed by each of the parallel processors 30.

The multiprocessor system 100 disclosed in the above-described Japanese Published Unexamined Patent Application No. 9-185593 enables the data FIFO 22 used to input and output data sets to be shared by all the pipelines, instead of providing a data FIFO 22 for each of the pipelines. Each pipeline is provided with a pointer FIFO 60 used to input and output the storage positions of data sets in the shared data FIFO 22. When a parallel processor 30 processes data, it first takes out a storage position from its own pointer FIFO 60, and then reads a data set from the storage position in the data FIFO 22. The pointer FIFO 60 provided for each pipeline may have a bit width enough to be able to identify the storage position in the data FIFO 22, and its size is thus smaller than that required to store data sets per se. Only one data FIFO 22 is required for the system 100 since it is shared by all the pipelines. According to the multiprocessor system 100 disclosed in Japanese Published Unexamined Patent Application No. 9-185593, therefore, a load imbalance can be eliminated without expanding the size of the data buffer unnecessarily.

Furthermore, due to the sharing, the multiprocessor system 100 disclosed in Japanese Published Unexamined Patent Application No. 9-185593 has no need to implement FIFOs having low usage efficiency so that its design and manufacturing costs are much reduced. Viewing from a different point, the multiprocessor system 100 disclosed in Japanese Published Unexamined Patent Application No. 9-185593 is faster than others having the same gate size.

However, the multiprocessor system 100 disclosed in Japanese Published Unexamined Patent Application No. 9-185593 still requires a pointer FIFO 60 for each parallel processor 30. It is also required to analyze from data characteristics how many stages the pointer FIFO 60 should have for each parallel processor 30. If the number of stages is not optimum, the performance of the system 100 is affected adversely.

SUMMARY OF THE INVENTION

In view of the above, it is an object of the present invention to provide a data processing system and a multiprocessor system that can have the optimal number of FIFO stages dynamically so that there is no need to analyze from data characteristics the number of FIFO stages so as to improve the system performance.

In order to achieve the above object, the data processing system of the present invention for distributing data sets received sequentially to a plurality of pipelines includes a data buffer having a plurality of storage positions for temporarily storing the data sets by defining target pipelines to which the data sets are to be distributed, a next pointer having a plurality of storage positions for temporarily storing second information relating to a storage position for a subsequent data set in said data buffer, and a read pointer for temporarily storing first information relating to a storage position for a preceding data set in said data buffer and for storing said second information after said preceding data set is read out from said data buffer. In the data processing system of the present invention, both of the data buffer and the next pointer are shared by the pipelines. The preceding and subsequent data sets can be read out sequentially from the data buffer according to the first and second information stored in the next pointer.

Furthermore, in the data processing system of the present invention, the read pointer is provided for each pipeline, and consists of a single storage position. The first information is updated to the second information after the preceding data set is read. Thus, the data sets can be read out from the data buffer and processed according to such information updated sequentially.

According to the present invention, a data processing system is provided which comprises a first buffer having N storage positions for storing data sets, and a second buffer having M storage positions each of which is associated with a storage position in said first buffer, wherein, when a preceding data set is stored in the n-th storage position of said first buffer and a subsequent data set is stored in the (n+a)-th storage position of said first buffer, the value (n+a) is stored in the n-th storage position of said second buffer as storage position information for said subsequent data set.

In this data processing system of the present invention, it is possible to specify that a data set to be read next is stored in the (n+a)-th storage position of the first buffer by reading the storage position information stored in the n-th storage position of the second buffer when a data set stored in the n-th storage position of the first buffer is read. The data processing system further comprises a read pointer for storing the storage position information read out from the second buffer, and a predetermined data set is read out from a storage position of the first buffer specified by the storage position information stored in the read pointer. In this case, the value (n+a) is stored in the read pointer and the subsequent data set is read out from the (n+a)-th storage position in the first buffer.

In the above data processing system, the number M of storage positions in the second buffer should be equal to or greater than the number N of storage positions in the first buffer. However, it is preferable that M is equal to N so that no wasteful storage position is provided.

The present invention further provide a data processing system for distributing data sets received sequentially to a plurality of pipelines which comprises a data buffer having a plurality of storage positions for temporarily storing said data sets by defining target pipelines to which said data sets are to be distributed, respectively, and a pointer having a plurality of storage positions corresponding to the storage positions of said data buffer, respectively, wherein, when a data set is stored in said data buffer, information relating to an empty storage position is stored in a storage position of said pointer corresponding to a storage position in which said data set is to be stored.

In this data processing system, the empty storage position information stored in the pointer indicates a storage position in the data buffer in which a data set is to be stored next. In order to store information on this storage position, a write pointer is provided for each pipeline. It is possible to store a data set received next in a predetermined storage position in the data buffer according to the information stored in the write pointer, by storing the information relating to the empty storage position in the write pointer.

The data processing system of the present invention may be used as a multiprocessor system for distributing sequentially received data sets to a plurality of pipelines, which comprises a dispatching processor for distributing the received data sets to the pipelines, a plurality of parallel processors, each of which is disposed at each of the pipelines and enabled to process a data set distributed thereto, a data buffer having a plurality of storage positions for temporarily storing one or more data sets output sequentially from said dispatching processor, a next pointer for storing information on a first storage position for a first data set in said data buffer and information on a second storage position for a second data set in said data buffer, said second data set being to be processed by a parallel processor after said parallel processor processes said first data set, a read pointer disposed before a parallel processor for each pipeline for sequentially storing said first storage position information and said second storage position information, a priority encoder for determining storage positions for said first and second data sets in said data buffer, and a plurality of multiplexers each of which is disposed between a parallel processor and said read pointer for each pipeline to read said first and second data sets sequentially from their storage positions in said data buffer according to said first and second storage position information stored in said read pointer, and pass said first and second data sets to the parallel processor.

In the multiprocessor system of the present invention, the next pointer has the same number of storage positions as that of the data buffer, and the storage positions of the next pointer are respectively associated with the storage positions of the data buffer. More specifically, the second storage position information is stored in a storage position of the next pointer associated with a storage position of the data buffer in which the first data set is stored. Then, after the first data set is read out from the data buffer, the second storage position information is read out from the next pointer, and a predetermined data set is read out from the data buffer according to this second storage position information.

The multiprocessor system of the present invention may further comprises a write pointer for temporarily storing information on a storage position in the data buffer in which a data set to be distributed to a parallel processor is stored. A data set received is stored in a predetermined storage position of the data buffer according to the information stored in this write pointer.

The multiprocessor system of the present invention may further comprises a merging processor for merging the data sets processed by the parallel processors.

Other objects, features, and advantages of the present invention will be recognized from the following detailed description of the preferred embodiments with reference to the accompanying drawings.

PREFERRED EMBODIMENTS OF THE INVENTION

Preferred embodiments of the present invention will be described below with reference to the accompanying drawings.

A. System Configuration

Figure 1:
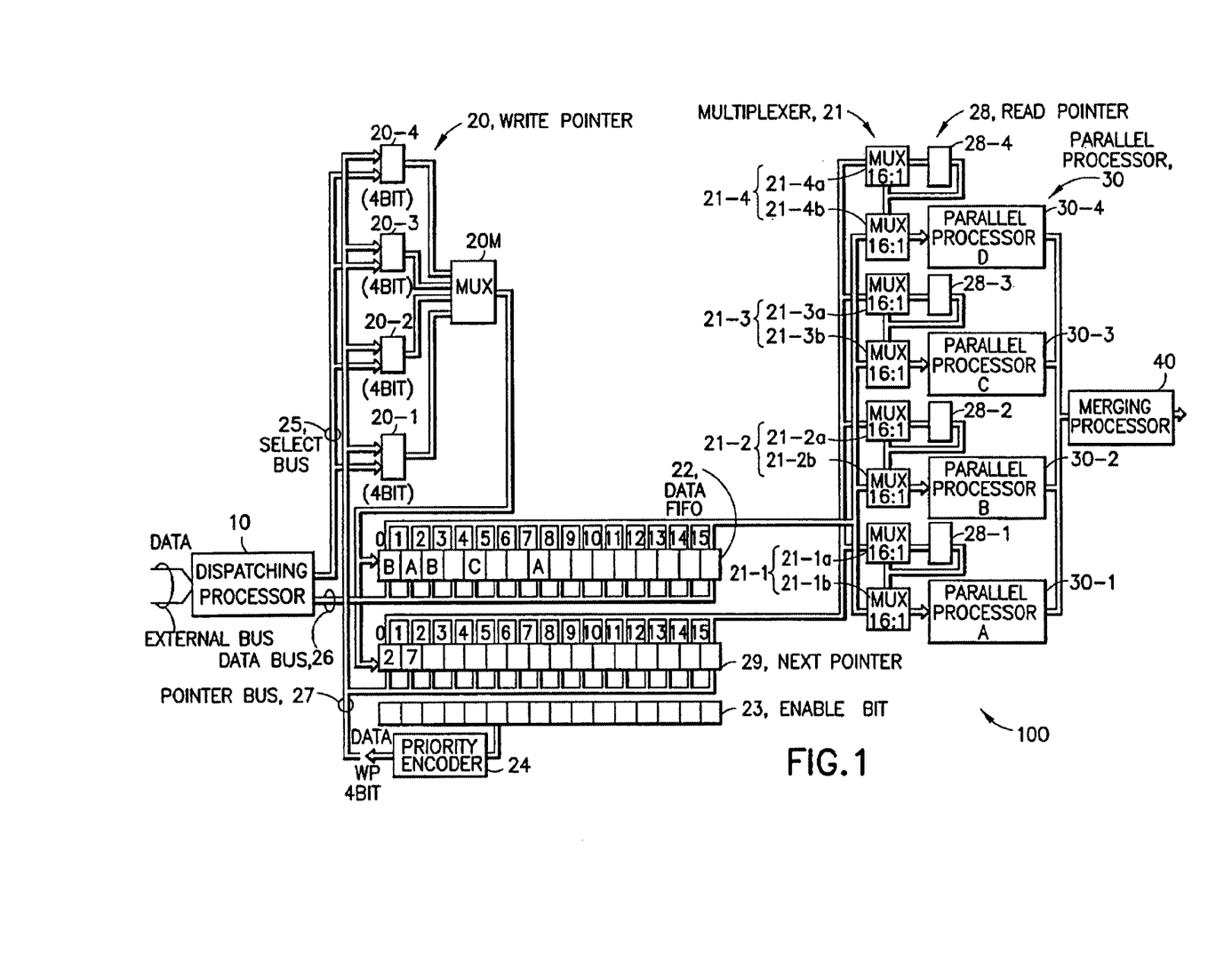
FIG. 1 is a hardware block diagram of a multiprocessor system according to the embodiment of the present invention.

First, a hardware configuration of the multiprocessor system 100 according to the embodiment of the present invention will be described with reference to the system block diagram shown in FIG. 1. In FIG. 1, the same components as those shown in FIG. 8 are referenced by the same reference numbers.

As shown in FIG. 1, the multiprocessor system 100 includes a dispatching processor 10 and a plurality of parallel processors 30. Write pointers 20, multiplexers 21, and read pointers 28 are provided for the respective parallel processors 30. The multiprocessor system 100 also includes a data FIFO 22, enable bits 23, a priority encoder 24, and a next pointer 29. In FIG. 1, the multiprocessor system 100 is assumed to have four pipelines in which reference numbers 30-1 through 30-4 are given to the respective parallel processors 30, reference numbers 20-1 through 20-4 are given to the respective write pointers 20, reference numbers 21-1 through 21-4 are given to the respective multiplexers 21, and reference numbers 28-1 through 28-4 are given to the respective read pointers 28. It should be noted that the number of pipelines is merely a design matter. The hardware blocks in the multiprocessor system 100 may be implemented on a single circuit chip together with buses (to be described later) between those hardware blocks by using, for example, the ASIC technique.

The dispatching processor 10 is a computing unit enabled to distribute processing of sequentially received data sets to the parallel processors 30-1 through 30-4 according to the their attributes, etc. The input of the dispatching processor 10 is connected to a device such as a graphic workstation (not shown) outside the multiprocessor system 100 via an external bus so as to sequentially receive data sets from the external device. The outputs of the dispatching processor 10 are a select bus 25 and a data bus 26. The select bus 25 transfers "select information" that specifies a target pipeline to which an output data set is distributed. The select bus 25 is connected to the write pointers 20-1 through 20-4 of the pipelines. The select bus 25 is just required to have a bit width enough to be able to identify a pipeline. In this embodiment, the bit width of the select bus 25 may be 2 bits because the number of pipelines is four. The data bus 26 transfers an entity of a data set to be distributed, and is connected to the data FIFO 22. The bit width of the data bus 26 is, for example, 32 bits.

The data FIFO 22 is a first-in first-out buffer used to temporarily store the entity of each data set output dispatched sequentially from the dispatching processor 10. Each storage position in the data FIFO 22 is enabled to receive a data set in response to a command from the priority encoder 24. The data FIFO 22 is not dedicated to any particular pipeline, but shared by all the pipelines. The data FIFO 22 in this embodiment can store up to 16 data sets though the number of storage positions is a design matter. Each storage position of the data FIFO 22 has a 32 bit width in accordance with the bit width of the data bus 26. The next pointer 29 and enable bits 23 are provided in association with the data FIFO 22.

As described above, the data FIFO 22 has 16 stages or storage positions 0-15. In FIG. 1, for example, "B" is shown in storage positions "0" and "2", indicating that these storage positions store data sets to be read out to and processed by the parallel processor B (30-2). In the same way, "A" is shown in storage positions "1" and "7", indicating that these storage positions store data sets to be read out to and processed by the parallel processor A (30-1). Also, "C" is shown in storage position "4", indicating that this storage position stores a data set to be read out to and processed by the parallel processor C (30-3).

The next pointer 29 is a buffer used to store information on a storage position in the data FIFO 22, which stores the subsequent data set. Describing with reference to FIG. 1, a data set to be read first by the parallel processor A (30-1) is the one stored in the storage position "1" of the data FIFO 22. "7" is stored in the storage position of the next pointer 29 corresponding to the storage position "1" of the data FIFO 22. This "7" indicates the storage position "7" of the data FIFO 22 which stores a data set to be read next to the parallel processor A (30-1). That is, a data set to be read next and processed by the parallel processor A (30-1) is stored in the storage position "7" of the data FIFO 22. This "7" is the information on a storage position for a subsequent data set in the data FIFO 22. For the parallel processor B (30-2), data sets to be read out to and processed by the parallel processor B (30-2) are stored in the storage positions "0" and "2" of the data FIFO 22 while "2" is stored in the storage position "0" of the next pointer 29 corresponding to the storage position "0" of the data FIFO 22. This "2" is the information on a storage position for a subsequent data set in the data FIFO 22.

Just like the data FIFO 22, the next pointer 29 is not dedicated to any particular pipeline but shared by all the pipelines. Also, the next pointer 29 in this embodiment has 16 stages for storing up to 16 data sets just like the data FIFO 22 though the number of stages is merely a design matter.

Each storage position of the next pointer 29 has a 4 bit width in accordance with the bit width of the pointer bus 27.

The enable bits 23 are bit flags for indicating whether valid data to be processed are stored in the respective storage positions of the data FIFO 22, or indicating write reservation for storing the valid data. Each time a data set is written in a storage position in the data FIFO 22 or the write reservation is made, a corresponding bit flag is set in the enable bits 23.

When the data set is read out from the data FIFO 22, the corresponding bit flag is reset.

The priority encoder 24 controls the data FIFO 22, the next pointer 29, and the enable bits 23 so as to store data sets output sequentially from the dispatching processor 10 and assign storage positions (pointers) to the pipelines. The main functions of the priority encoder 24 are as follows.

(1) To find empty storage positions in the data FIFO 22 by referencing (encoding) the enable bits 23.

(2) To select one of the empty storage positions for storing a data set received next.

(3) To transfer information relating to the selected storage position to the write pointers 20-1 through 20-4 and the next pointer 29 via the pointer bus 27.

On the other hand, a storage position of the data FIFO 22 specified via the pointer bus 27 is enabled to receive a data set. Upon receiving a data set via the data bus 26, the data FIFO 22 stores it in the specified storage position. At the same time, the information (empty storage position information: one of "0" through "15") output from the priority encoder 24 is stored in a storage position of the next pointer 29, which corresponds to the storage position of the data FIFO 22 storing the data set (preceding data set). When the new information is written in the next pointer 29, a corresponding bit flag in the enable bits 23 is set so that the storage position is reserved for a next data set. The pointer bus 27 is just required to have a bit width enough to identify a position in the data FIFO 22. In this embodiment, the pointer bus 27 has a 4 bit width because the data FIFO 22 has 16 stages. Each of the four pipelines is configured by a write pointer 20, a multiplexer 21, a read pointer 28, and a parallel processor 30. The write pointer 20 is a register for indicating a storage position in the data FIFO 22 in which a data set received is written. The write pointer 20 receives information on such a storage position from the priority encoder 24 via the pointer bus 27. This information is transferred to the data FIFO 22 and the next pointer 29 via the multiplexer 20M. Each of the write pointers 20-1 through 20-4 is enabled to receive an input in response to the "select information" from the select bus 25. Each write pointer 20 has a 4 bit width in accordance with the pointer bus 27.

The read pointer 28 is a register for indicating a storage position in the data FIFO 22 from which a data set is next read. The read pointer 28 receives the contents of a storage position from the next pointer 29 via the pointer bus 27.

The multiplexer 21 is composed of a first multiplexer 21-*ia* and a second multiplexer 21-*ib* (i=1, 2, 3, 4). The first multiplexer 21-*ia* receives information on a storage position (hereinafter referred to as a pointer) in the data FIFO 22 storing a data set to be read next and passes it to the read pointer 28 after a data set specified by the read pointer 28 is read.

On the other hand, the second multiplexer 21-*ib* recognizes a pointer stored in the read pointer 28, reads a data set in the corresponding storage position in the FIFO 22, and passes it to the parallel processor 30. When the data set is read, a corresponding bit flag in the enable bits 23 is reset to invalidate the contents of the storage position.

The parallel processor 30 processes the data set received from the second multiplexer 21-*ib* in a predetermined manner, and outputs its result to the merging processor 40. The merging processor 40 integrates the data sets output from the respective pipelines and passes the integrated data sets to a device such as a graphic workstation (not shown) outside the multiprocessor system 100. Since processing operations in the parallel processors 30 and the merging processor 40 are not relevant to the present invention, further description thereof will not be made here.

The multiprocessor system 100 may be used for the texture mapping in three-dimensional graphics processing, in which the multiprocessor system 100 constitutes a part of a graphics adapter for three-dimensional processing and the graphics adapter itself is connected to a graphics workstation via a bus.

B. System Operations

The hardware configuration of the multiprocessor system 100 of the present invention has been described above. Next, the operations of the multiprocessor system 100 will be described below with reference to FIGS. 2 through 5.

Figure 2:
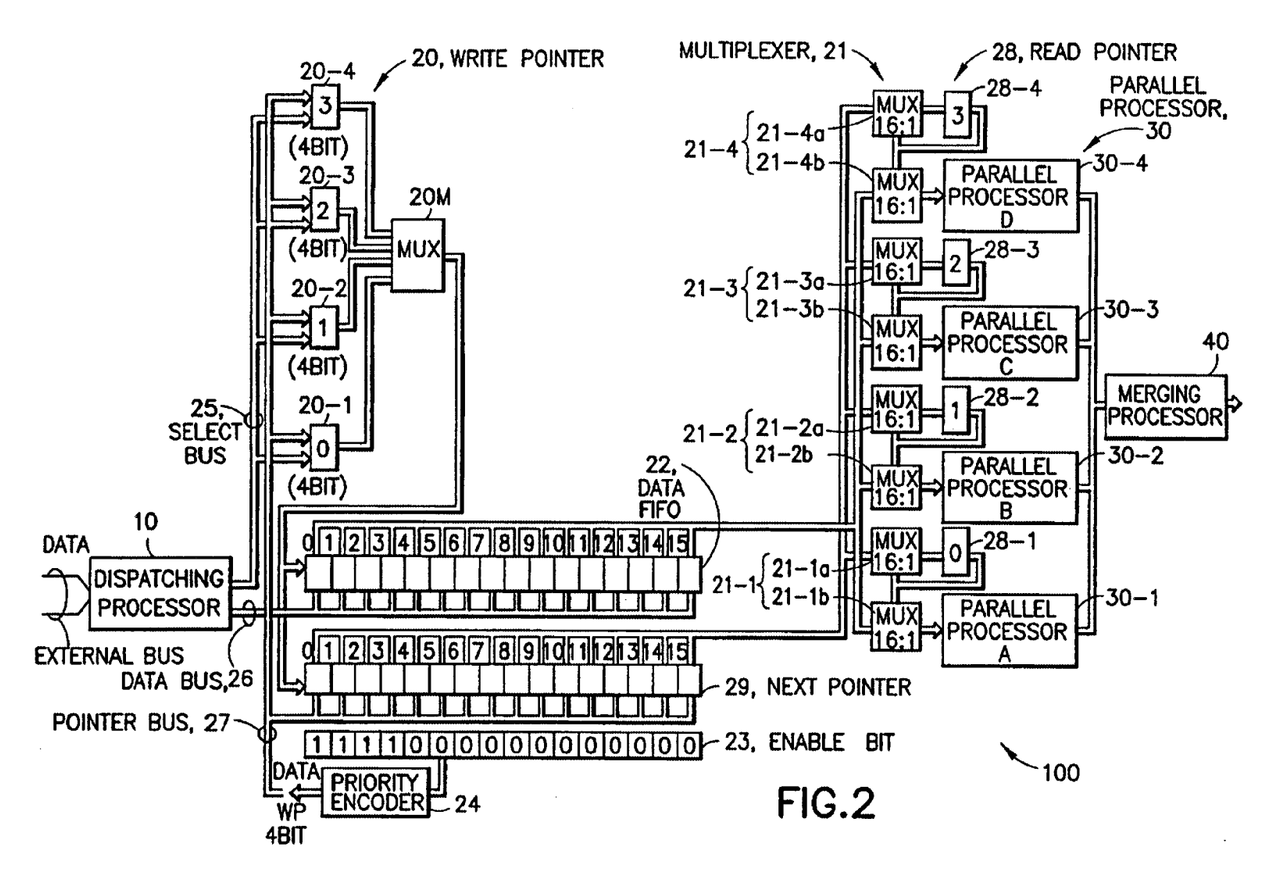
FIG. 2 is a block diagram of the multiprocessor system according to the embodiment of the present invention, which is reset.

B-1. Reset Operation (FIG. 2)

Upon resetting, predetermined values are stored as initial values in the write pointers 20-1 through 20-4 and the read pointers 28-1 through 28-4. For example, "0 (zero)" is stored in the write pointer 20-1 and the read pointer 28-1 associated with the parallel processor A (30-1). In the same way, "1" is stored in the write pointer 20-2 and the read pointer 28-2, "2" in the write pointer 20-3 and the read pointer 28-3, and "3" in the write pointer 23-4 and the read pointer 28-4.

At the same time, "1" is set in the stages 0 through 3 of the enable bits 23, indicating that reservation for writing has been made and the corresponding enable bits are valid. In the other stages which are neither reserved nor written, "0" is set.

Figure 3:
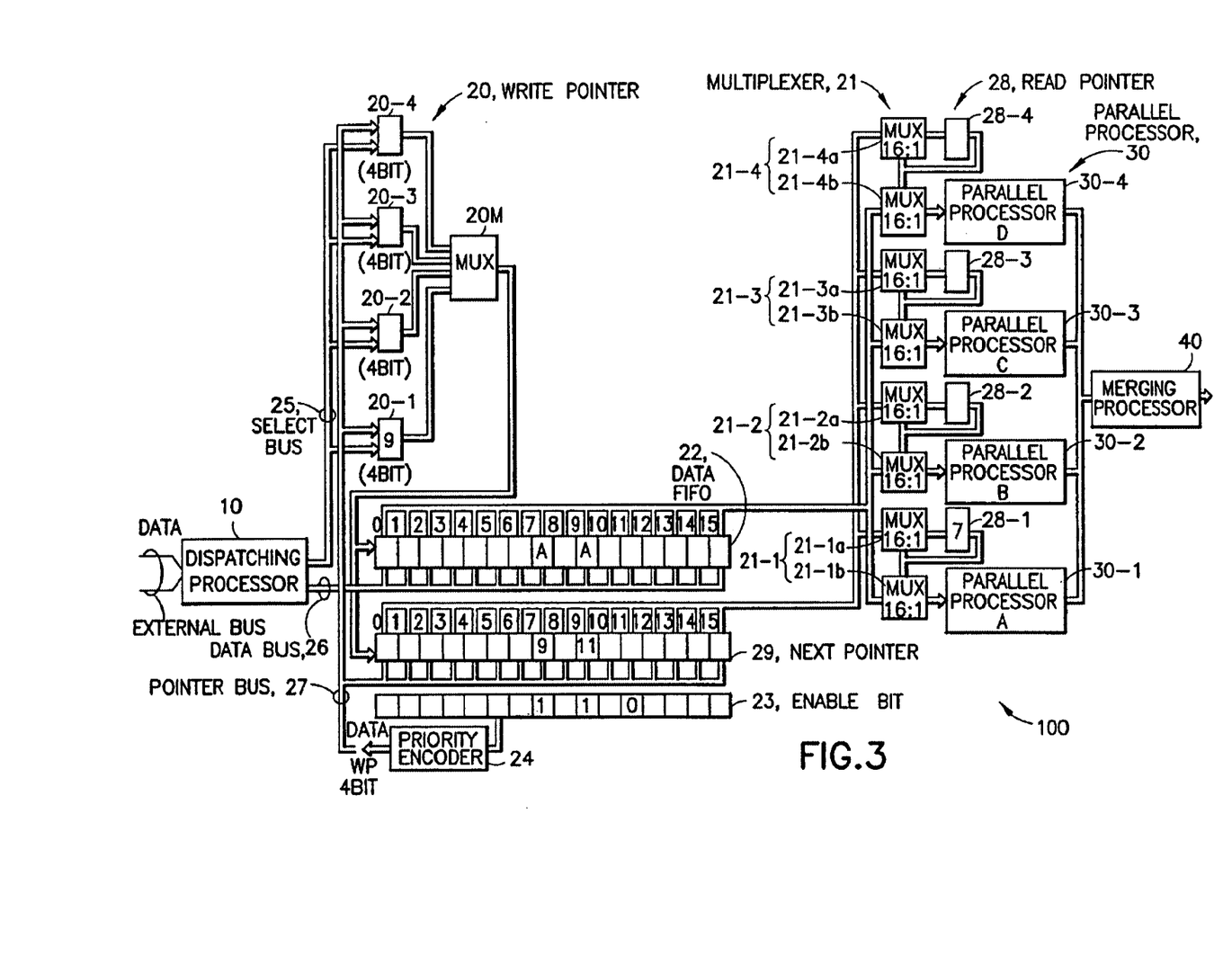
FIG. 3 is a block diagram of the multiprocessor system according to the embodiment of the present invention, which is performing a write operation.

B-2. Write Operation (FIG. 3)

Next, an operation for writing data sets output from the dispatching processor 10 into the data FIFO 22 will be described. In FIG. 3, it is premised that the dispatching processor 10 outputs a data set to be distributed to the parallel processor A (30-1) while a preceding data set to be distributed to the parallel processor A (30-1) has been stored in the storage position "7" of the data FIFO 22, the storage position "9" has been reserved for next writing, and the number "9" of the storage position to be written next has been stored in the write pointer 20-1.

The data set output from the dispatching processor 10 is added with information indicating one of the parallel processors A through D which should process the data set.

For example, the priority encoder 24 searches an empty storage position in the data FIFO 22 by referencing (encoding) the enable bits 23. In FIG. 3, since the eleventh bit flag is reset, the priority encoder 24 selects the storage position "11" in the data FIFO 22 and transmits its selection as storage position information over the pointer bus 27.

It is assumed that, at a given point of time, the dispatching processor 10 outputs a data set to be dispatched to the parallel processor A (30-1). Then, the dispatching processor 10 transmits select information over the select bus 25 so as to permit data input to the write pointer 20-1 only, and transmits the data set over the data bus 26.

The write pointer 20-1, which is in the input permission state, receives the storage position information from the pointer bus 27 and a pointer value "11" is written therein. In the data FIFO 22, the storage position "9" specified via the multiplexer 20M is enabled to receive a data set.

As a result, a subsequent data set received via the data bus 26 is stored in the storage position "9". In FIG. 3, a letter "A" is written in the storage position "9" of the data FIFO 22, indicating that a data set to be distributed to the parallel processor A (30-1) exists. At the same time, a number "11" is stored in the storage position "9" of the next pointer 29, indicating that the next data set has been stored in the storage position "11" of the data FIFO 22. Also, at the same time, "1" is written in the storage position "11" of the enable bits 23, indicating that reservation has been made.

B-3. Read Operation (FIGS. 4 and 5)

Next, an operation for reading data sets from the data FIFO 22 by the parallel processors 30-1 through 30-4 will be described.

Figure 4:
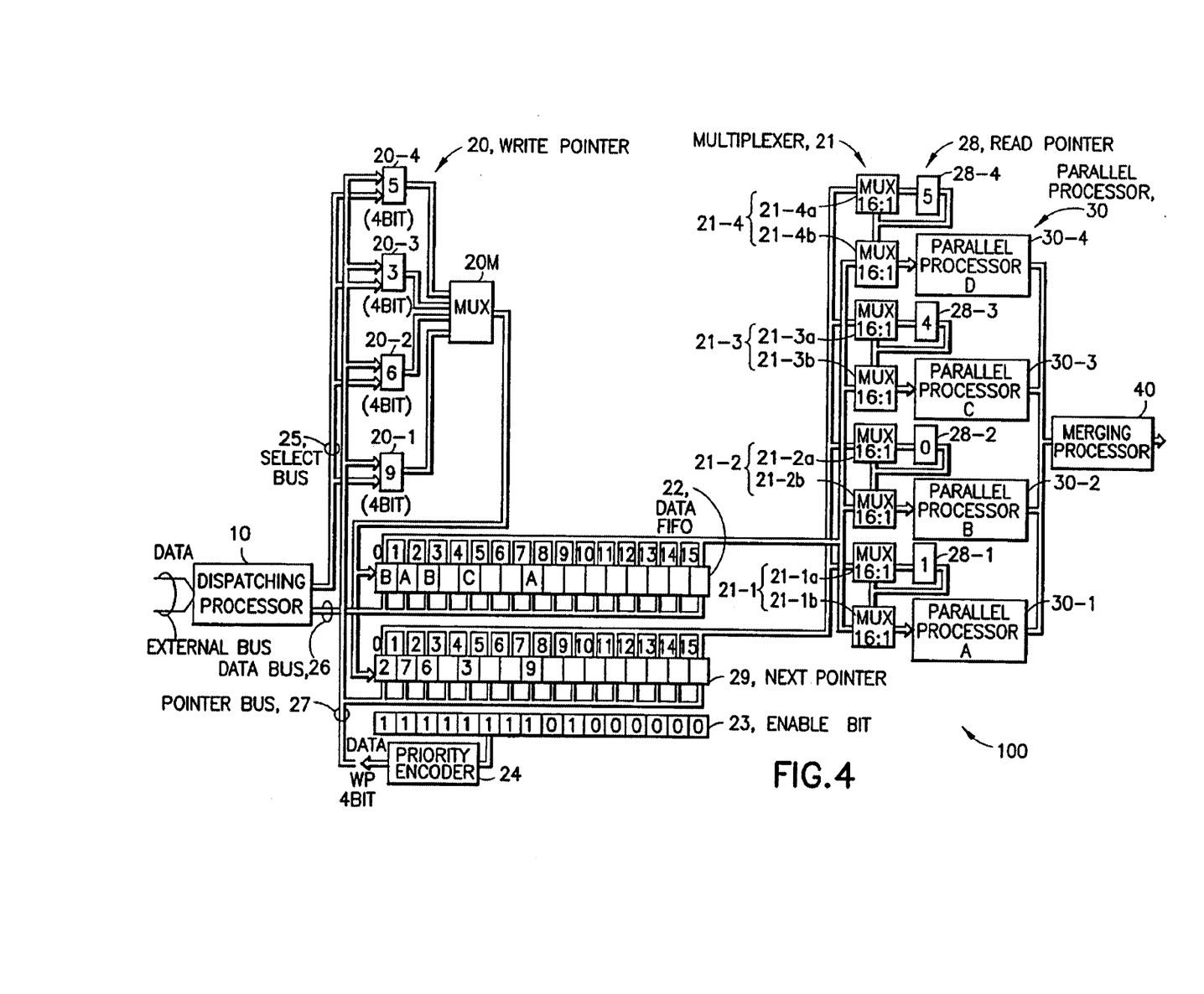
FIG. 4 is a block diagram of the multiprocessor system according to the embodiment of the present invention in which the stored contents of the write pointers 20, the data FIFO 22, the next pointer 29, and the read pointers 28 at a given point of time are shown.
Figure 5:
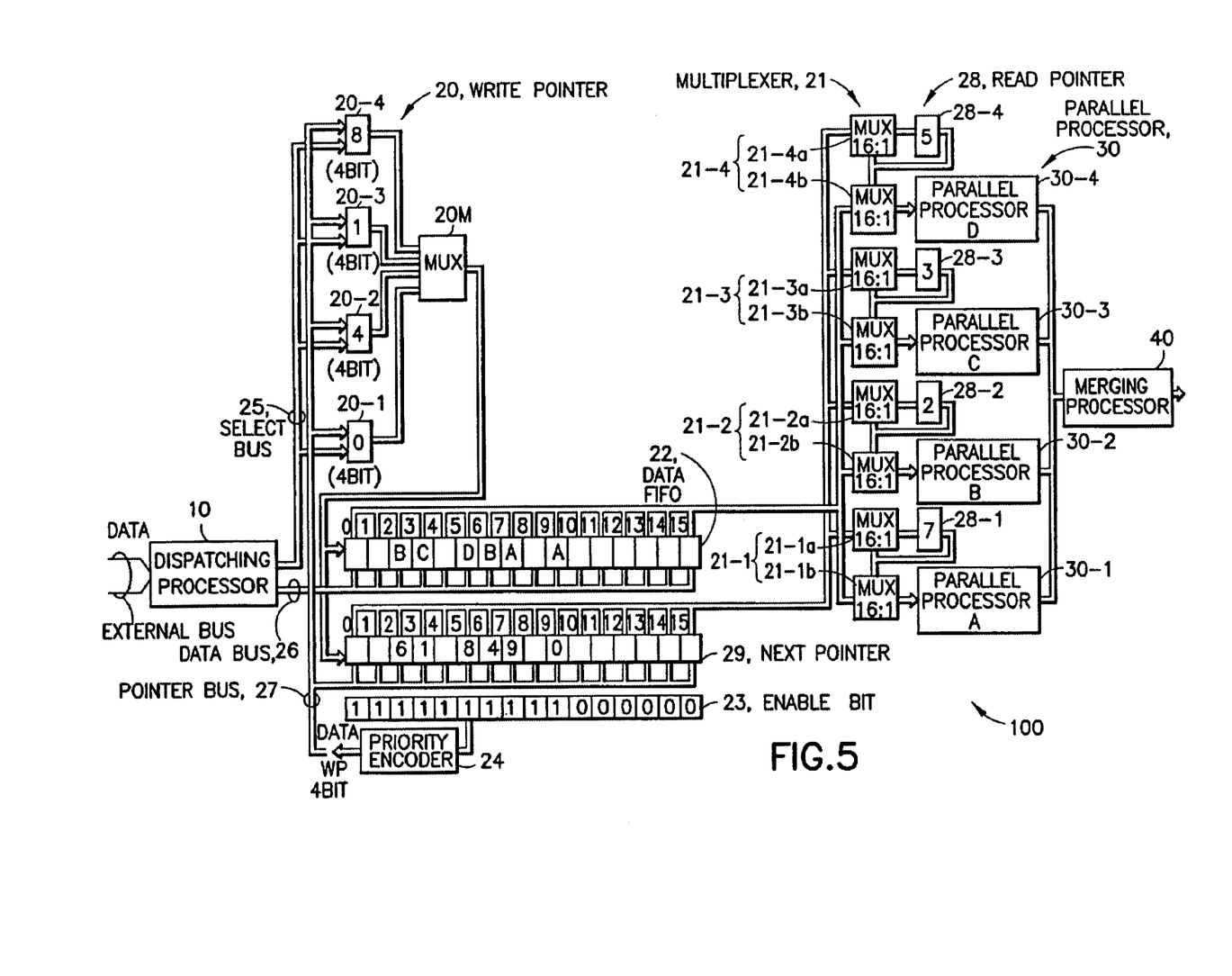
FIG. 5 is a block diagram of the multiprocessor system according to the embodiment of the present invention in which the stored contents of the write pointers 20, the data FIFO 22, the next pointer 29, and the read pointers 28 at a point of time following that shown in FIG. 4.

In FIG. 4, the stored contents of the write pointers 20, the data FIFO 22, the next pointer 29, and the read pointers 28 at a given point of time are shown. Specifically, data sets to be distributed to the parallel processors B, A, B, C, and A are written in the storage positions "0", "1", "2", "4", and "7" of the data FIFO 22, where A, B, C, and D represent the parallel processors A (30-1), B (30-2), C (30-3), and D (30-4), respectively.

On the other hand, pointer values reflecting the stored contents of the data FIFO 22 are written in the write pointers 20-1 through 20-4. Storage positions in the data FIFO which store no data set, that is, empty storage positions are "3", "5", "6", "8", and "9" through "15" at the present time. Among them, "9" is stored in the write pointer 20-1, "6" is stored in the write pointer 20-2, "3" is stored in the write pointer 20-3, and "5" is stored in the write pointer 20-4.

Furthermore, pointer values reflecting the stored contents of the data FIFO 22 are also written in the read pointers 28-1 through 28-4. Specifically, data sets to be distributed to the parallel processor A (30-1) are stored in the storage positions "1" and "7" in the data FIFO 22, and "11" is stored in the read pointer 28-1, indicating that the storage position "1" should be read first. In the same way, the read pointer 28-2 stores "0" and the read pointer 28-3 stores "14". The read pointer 28-4 stores "5" while the storage position "5" in the data FIFO 22 stores no data set. This is because the write pointer 20-4 stores "5" as a pointer value and, hence, a data set to be distributed to the parallel processor D (30-4) will be stored in the storage position "5" at the next time. In this way, if the value of the read pointer is equal to that of the write pointer, no data is stored.

The storage positions "0", "1", "2", "4", and "7" of the next pointer 29 store storage position information for the data sets in the data FIFO 22 to be read next and distributed to the parallel processors B, A, B, C, and A, respectively. Specifically, as for the parallel processor B, since the next data set is stored in the storage position "2" in the data FIFO 22, "2" is stored in the storage position "0" of the next pointer 29. "6" is stored in the storage position "2" of the next pointer 29. Although there is no data set to be distributed to the parallel processor B in the storage position "6" of the data FIFO 22, "6" is stored in the write pointer 20-2, which indicates that the next data set to be distributed to the parallel processor B is stored in the storage position "6" 1 of the data FIFO 22. This is also true for the parallel processor C.

As for the parallel processor A, since the next data set is stored in the storage position "7" of the data FIFO 22, "7" is stored in the storage position "1" of the next pointer 29. In addition, "9" is stored in the storage position "7" of the next pointer 29. This "9" corresponds to the "9" stored in the write pointer 20-1.

Each bit flag of the enable bits 23 is set or reset in accordance with the usage status of each storage position in the data FIFO 22 and the storage status of the write pointers 20. Specifically, even when there is an empty storage position in the data FIFO 22, a corresponding bit flag of the enable bits 23 is set for the storage position of the data FIFO 22 whose number is stored any one of the write pointer 20.

At this time, the second multiplexer 21-1b receives the pointer value "1" from the read pointer 28-1. Then, the second multiplexer 21-1b reads a data set from the storage position "1" of the data FIFO 22 and passes it to the parallel processor A (30-1). In the same way, the second multiplexer 21-2b reads the pointer value "0" from the read pointer 28-2. Then, the second multiplexer 21-2b reads a data set from the storage position "0" of the data FIFO 22 and passes it to the parallel processor B (30-2). Also, the second multiplexer 21-3b reads the pointer value "4" from the read pointer 28-3. Then, the second multiplexer 21-3b reads a data set from the storage position "4" of the data FIFO 22 and passes it to the parallel processor C (30-3). The second multiplexer 21-4b reads the pointer value "5" from the read pointer 28-4. However, since the storage position "5" of the data FIFO 22 is empty at that time, the second multiplexer 21-4b does not read any data set from the data FIFO 22.

The parallel processors A (30-1) through D (30-4) of the respective the pipelines perform predetermined processing on the data sets received from the multiplexers 21-1 through 21-4, respectively, and output the processed data sets to the merging processor 40. The merging processor 40 then merges the received data sets again and passes the merged result to a device such as a graphic workstation (not shown) outside the multiprocessor system 100.

FIG. 5 shows the stored contents of the write pointers 20, the data FIFO 22, the next pointer 29, and the read pointers 28 at a timing next to that shown in FIG. 4. Specifically, in FIG. 5, the data sets to be distributed to the parallel processors B, C, D, B, A, and A are stored in the storage positions "2", "3", "5", "6", "7", and "9" of the data FIFO 22.

On the other hand, pointer values reflecting the stored contents of the data FIFO 22 are written in the write pointers 20-1 through 20-4 of the pipelines. The storage positions "0," "1", "4", "8", and "10" through "15" in the data FIFO 22 are empty at present. Of these storage positions, the write pointer 20-1 stores "0", the write pointer 20-2 stores "4", the write pointer 20-3 stores "1", and the write pointer 20-4 stores "8".

Also, pointer values reflecting the stored contents of the data FIFO 22 are stored in the read pointers 28-1 through 28-4 of the pipelines. Specifically, the data sets to be distributed to the parallel processor A (30-1) are stored in the storage positions "7" and "9" in the data FIFO 22 while a pointer value "7" is stored in the read pointer 28-1 which indicates that the storage position "7" should be read first. In the same way, "2" is stored in the read pointer 28-2 and "3" is stored in the read pointer 28-3, and "5" is stored in the read pointer 28-4.

The storage positions "2", "3", "5", "6", "7", and "9" of the next pointer 29 store information indicating the storage positions in the data FIFO 22 for the subsequent data sets to be read next and distributed to the parallel processors B, C, D, B, A, and A, respectively. Specifically, as for the processor B, since the next data set is stored in the storage position "6" of the data FIFO 22, "6" is stored in the storage position "2" of the next pointer 29. Although any data set to be distributed to the parallel processor B is not stored in the storage position "4" in the data FIFO 22, "4" is stored in the storage position "6" of the next pointer 29 because the write pointer 20-2 stores "4" which indicates that the next data set to be distributed to the parallel processor B will be stored in the storage position "4" in the data FIFO 22. This is also true for the parallel processors C, D, and A.

Each bit flag of the enable bits 23 is set or reset in accordance with the usage status of the storage positions in the data FIFO 22 the storage status of the write pointers 20. Specifically, even when there is a unused storage position in the data FIFO 22, a corresponding bit flag of the enable bits 23 is set for the storage position in the data FIFO 22 whose number is stored any one of the write pointer 20.

At this time, the second multiplexer 21-1b receives a pointer value "7" from the read pointer 28-1. Then, the second multiplexer 21-1b reads a data set from the storage position "7" in the data FIFO 22 and passes it to the parallel processor A (30-1). In the same way, the second multiplexer 21-2b receives a pointer value "2" from the read pointer 28-2. Then, the second multiplexer 21-2b reads a data set from the storage position "2" in the data FIFO 22 and passes it to the parallel processor B (30-2). The second multiplexer 21-3b receives a pointer value "3" from the read pointer 28-3. Then, the second multiplexer 21-3b reads a data set from the storage position "3" in the data FIFO 22 and passes it to the parallel processor C (30-3). The second multiplexer 21-4b receives a pointer value "5" from the read pointer 28-4. Then, the second multiplexer 21-4b reads a data set from the storage position "5" in the data FIFO 22 and passes it to the parallel processor D (30-4).

The parallel processors A (30-1) through D (30-4) of the respective pipelines perform predetermined processing on the data sets received from the multiplexers 21-1 through 21-4, respectively, and then output the processed data sets to the merging processor 40. The merging processor 40 then merges the received data sets again and passes the merged result to the device such as a graphic work station (not shown) outside the multiprocessor system 100.

Reference is made to the pipeline of the parallel processor A (30-1) in FIGS. 4 and 5. In FIG. 4, the storage positions "1" and "7" of the data FIFO 22 store data sets to be read and processed by the parallel processor A (30-1). In this case, the data set stored in the storage position "1" is a preceding data set while the data set stored in the storage position "7" is a subsequent data set. The corresponding storage positions in the next pointer 29 stores "7" and "9", respectively. It is assumed here that "1" is defined as first information and "7" is defined as second information. At this time, "1" is stored in the read pointer 28-1. After the data set is read from the storage position "1" in the data FIFO 22, "7" is stored in the read pointer 28-1 as shown in FIG. 5. That is, the read pointer 28-1 stores the first information which is updated to the second information after the preceding data set is read.

Advantages of the present invention in reducing the gate size of the data buffer may be clearly proved by the following calculation.

For example, assuming that the bit width of a data set is 32 bits and a data FIFO provided for each pipeline has 12 storage positions in the conventional multiprocessor system 100 shown in FIG. 6, the total FIFO gate size of the system reaches 32 (bit width)×12 (storage positions)×4 (pipelines)= 1536 bits.

Also, in the conventional multiprocessor system 100 shown in FIG. 8, the total gate size of the pointer FIFOs 60-1 through 60-4 become 4 (bit width)×12 (storage positions)×4 (pipelines)=192 bits. The gate size of the data FIFO 22 is 32 (bit width)×16 (storage positions)=512 (bits) and the enable bits 23 consists of 16 bits. Consequently, the gate size required for the storage elements in the multiprocessor system 100 becomes 192 (pointer FIFOs)+512 (data FIFO)+ 16 (enable bits)=720 bits.

In the multiprocessor system 100 of the present invention, however, the gate size of the data FIFO 22 is 32 (bit width)×16 (storage positions)=512 (bits) and the enable bits 23 consists of 16 bits. The next pointer 29 is 4 (bit width)×16 (storage positions)=64 (bits) and the write pointers 20 is 4 (bit width)×4 (pipelines)=16 (bits), and the read pointers 28 is 4 (bit width)×4 (pipelines)=16 (bits). Consequently, the total gate size required for the storage elements in the multiprocessor system 100 becomes 512 (data FIFO)+16 (enable bits)+64 (next pointer)+16 (write pointers)+16 (read pointers)=624 bits. Thus, the gate size becomes smaller and the design and manufacturing costs are cheaper than those of the conventional multiprocessor system 100 even when additional circuits are used.

C. Supplement

While the present invention has been described in detail with reference to the specific embodiments, it is to be understood that modifications and replacements will be apparent to those skilled in the art without departing from the spirit of the present invention. Although a multiprocessor system has been taken as an example in the above embodiments, the present invention is not limited thereto, of course. Also, while a description has been made for the embodiments in which such a multiprocessor system is used for the texture mapping, the present invention is not limited to that application. In short, the present invention has been disclosed as an illustrative form which should not be construed restrictively. The scope of the present invention, therefore, should be determined solely by the Claims.

Advantages of the Invention

As described in detail above, the present invention provides an excellent multiprocessor system that can conveniently accommodate the load distribution even when loads distributed among parallel processors are uneven at a moment.

In the multiprocessor system according to the present invention, a data input buffer (FIFO) is shared by all the pipelines, rather than providing such a data input buffer for each pipeline. Therefore, according to the present invention, it is possible to provide a multiprocessor system that can accommodate the uneven load distribution without increasing the number of FIFO stages (or data buffer size) in each parallel processor.

Furthermore, according to the multiprocessor system of the present invention, the data FIFO is shared as described above so that the number of its stages can be held smaller. As a result, it is possible to omit FIFOs of low usage efficiency so that economical circuit design is realized. From another viewpoint, the multiprocessor system of the present invention is faster than the conventional one when the gate size is the same in both systems.

Furthermore, while the conventional multiprocessor system is provided with a pointer FIFO having multi-stages for each pipeline, there is no need to have such a provision in the present invention. In addition, the operation of the present multiprocessor system is the same as that of the conventional multiprocessor system which includes a pointer FIFO having multi-stages. Furthermore, the number of stages of the next pointer in the present invention varies for each pipeline as the case may be so that the next pointer dynamically has the optimum number of stages at any given time. Consequently, there is no need to analyze the number of FIFO stages from data characteristics so as to improve the performance.

What is claimed is:

1. A data processing system for distributing data sets received sequentially to a plurality of pipelines for processing, said system comprising:

a data buffer having a plurality of storage positions for temporarily storing said data sets by defining target pipelines to which said data sets are to be distributed, respectively;

a next pointer having a plurality of storage positions for temporarily storing second information relating to a storage position for a subsequent data set in said data buffer; and a read pointer for temporarily storing first information relating to a storage position for a preceding data set in said data buffer and for storing said second information after said preceding data set is read out from said data buffer.

2. The data processing system according to claim 1, wherein said data buffer and said next pointer are shared by said plurality of pipelines.

3. The data processing system according to claim 1, wherein said read pointer is provided for each pipeline and has a single storage position.

4. The data processing system according to claim 1, wherein said read pointer enables said first information to be updated to said second information after said preceding data set is read out from said data buffer.

5. A data processing system comprising:

a first buffer having N storage positions for storing data sets; and a second buffer having M storage positions each of which is associated with a storage position in said first buffer;

wherein, when a preceding data set is stored in the n-th storage position of said first buffer and a subsequent data set is stored in the (n+a)-th storage position of said first buffer (a: an integer), the value (n+a) is stored in the n-th storage position of said second buffer as storage position information for said subsequent data set.

6. The data processing system according to claim 5, wherein, when a data set stored in said n-th storage position of said first buffer is read, said storage position information stored in said n-th storage position of said second buffer is also read.

7. The data processing system according to claim 5, wherein the number N of storage positions of said first buffer is equal to the number M of storage positions of said second buffer.

8. The data processing system according to claim 6, further comprising a read pointer for storing said storage position information read out from said second buffer, wherein a predetermined data set is read out from a storage position in said first buffer specified by the storage position information stored in said read pointer.

9. A data processing system for distributing data sets received sequentially to a plurality of pipelines for processing, said system comprising:

a data buffer having a plurality of storage positions for temporarily storing said data sets by defining target pipelines to which said data sets are to be distributed, respectively; and a pointer having a plurality of storage positions corresponding to the storage positions of said data buffer, respectively;

wherein, when a data set is stored in said data buffer, information relating to an empty storage position is stored in a storage position of said pointer corresponding to a storage position in which said data set is to be stored.

10. The data processing system according to claim 9, wherein a write pointer is provided for each pipeline to temporarily store information relating to the storage position in said data buffer in which said data set is stored, and said empty storage position information is also stored in said write pointer.

11. A multiprocessor system for distributing data sets received sequentially to a plurality of pipelines for processing, said system comprising:

a dispatching processor for distributing the received data sets to the pipelines;

a plurality of parallel processors, each of which is disposed at each of the pipelines and enabled to process a data set distributed thereto;

a data buffer having a plurality of storage positions for temporarily storing one or more data sets output sequentially from said dispatching processor;

a next pointer for storing information on a first storage position for a first data set in said data buffer and information on a second storage position for a second data set in said data buffer, said second data set to be processed by a parallel processor after said parallel processor processes said first data set;

a read pointer disposed before a parallel processor for each pipeline for sequentially storing said first storage position information and said second storage position information;

a priority encoder for determining storage positions for said first and second data sets in said data buffer; and a plurality of multiplexers each of which is disposed between a parallel processor and said read pointer for each pipeline to read said first and second data sets seqentially from their storage positions in said data buffer according to said first and second storage position information stored in said read pointer, and pass said first and second data sets to the parallel processor.

12. The multiprocessor system according to claim 11, wherein said next pointer has the same number of storage positions as that of said data buffer, and the storage positions of said next pointer are respectively associated with the storage positions of said data buffer.

13. The multiprocessor system according to claim 11, further comprising a write pointer for temporarily storing information on a storage position in said data buffer in which a data set to be distributed to a parallel processor is stored.

14. The multiprocessor system according to claim 11, further comprising a merging processor for merging the data sets processed by said parallel processors.

* * * * *